(12) United States Patent
Ota et al.

(10) Patent No.: US 7,580,460 B2
(45) Date of Patent: Aug. 25, 2009

(54) VIDEO ENCODER WITH MULTIPLE OUTPUTS HAVING DIFFERENT ATTRIBUTES

(75) Inventors: Takaaki Ota, San Diego, CA (US); Dave Desch, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1124 days.

(21) Appl. No.: 10/403,103

(22) Filed: Mar. 28, 2003

(65) Prior Publication Data
US 2004/0190618 A1 Sep. 30, 2004

(51) Int. Cl.
*H04N 7/12* (2006.01)
(52) U.S. Cl. .............................. 375/240.16; 375/240.12
(58) Field of Classification Search ..............................
375/240.01–240.07, 240.12–240.16, 240.2,
375/240.24, 240.26, 240.11, 240.25, 240.1
See application file for complete search history.

(56) References Cited

U.S. PATENT DOCUMENTS

| | | | | |
|---|---|---|---|---|
| 5,418,570 A * | 5/1995 | Ueno et al. | ............ | 375/240.14 |
| 5,926,231 A * | 7/1999 | Jung | ........................... | 348/699 |
| 5,952,943 A * | 9/1999 | Walsh et al. | ................... | 341/50 |
| 5,978,029 A * | 11/1999 | Boice et al. | ............ | 375/240.14 |
| 6,198,769 B1 * | 3/2001 | Mihara | ................... | 375/240.12 |
| 6,263,114 B1 * | 7/2001 | Saunders | ..................... | 382/239 |
| 6,462,681 B1 * | 10/2002 | Van Der Vleuten et al. | ... | 341/50 |
| 6,480,541 B1 * | 11/2002 | Girod et al. | ............. | 375/240.12 |
| 6,516,095 B1 * | 2/2003 | Kadono | ....................... | 382/243 |
| 2002/0009150 A1 * | 1/2002 | Le Maguet | ............. | 375/240.25 |
| 2002/0131084 A1 * | 9/2002 | Andrew et al. | ............. | 358/1.16 |
| 2003/0012275 A1 * | 1/2003 | Boice et al. | ............. | 375/240.01 |

OTHER PUBLICATIONS

PCT/US04/09095 International Search Report Feb. 17, 2005.
International Search Report PCT/US04/09095 (81018pct) mail date Feb. 17, 2005.
Preliminary Patentability Report PCT/US04/09095 (81018pct) mail date Feb. 17, 2005.
Written Opinion of the International Searching Authority PCT/US04/09095 (81018pct) mail date Feb. 17, 2005.

* cited by examiner

*Primary Examiner*—Gims S Philippe
(74) *Attorney, Agent, or Firm*—Fitch, Even, Tabin & Flannery (57) ABSTRACT

A video encoder having multiple channels each capable of producing an independently controlled encoded output. In one embodiment, the video encoder has circuitry common to all of the channels and separate circuitry for each channel. The common circuitry can include a motion compensator, a transformer, and a local decoder. One or more of the separate circuitry can include a quantizer, a scanner, an encoder, and a buffer. Each channel includes quantization feedback, and one channel output is fed back to the local decoder for use in generating reference pictures. The channels are separately controllable for the characteristics of at least one of quantization, scanning, and encoding.

26 Claims, 7 Drawing Sheets

VIDEO ENCODER WITH MULTIPLE OUTPUTS HAVING DIFFERENT ATTRIBUTES

FIELD OF THE INVENTION

The claimed invention relates to video signal compression. More particularly, the invention relates to encoding of video signals and video encoders.

BACKGROUND OF THE INVENTION

Several video compression specifications have been developed under the auspices of the Motion Picture Expert Group ("MPEG"), such as MPEG and MPEG-2. An MPEG signal has six layers of syntax. These are a sequence layer, a group of pictures ("GOP") layer, a picture layer, a slice layer, a macroblock layer, and a block layer. A video signal is a stream of pictures or frames. Each picture is represented by a predetermined number of picture elements ("pixels") per line and lines per picture. Pixels are coded as luminance and two color difference components, generally denoted as Y, $C_B$, and $C_R$, respectively. Pictures are generally broken up into "blocks." Blocks are rectilinear groups of pixels, generally 8 by 8 in number.

A GOP is a set of pictures or frames that starts with an I-frame and includes P-frames and/or B-frames. An I-frame (intra frame) or Intra-picture (I-picture) is encoded using only information available within that frame (intra coding). The coding of I-frames results in the most bits compared with P-frames and B-frames. A P-frame (predicted frame) encoding uses motion compensated information relative to a previous I-frame or P-frame. A B-frame (bidirectional frame) encoding uses motion compensated information relative to both a preceding frame and a following frame as reference frames.

A video encoder compresses a video signal for more efficient transmission and storage. This saves bandwidth in transmission or memory in storage. Additionally, depending on the parameters used during video encoding, a signal can be tailored for display on a specific end display device. By way of example, different devices generally have different display resolution capability and different bit rate capability. By proper selection of the processing parameters, an encoded video signal can be tailored for decoding and display on any given display device.

Increasingly, video systems in businesses, schools, universities, homes, and so forth, for example, have multiple display devices which may need to display the same video stream simultaneously. Traditionally, this was accomplished by simply fanning out the same video signal to all the selected display devices. In cases where video signals having different encoding characteristics are required, the traditional solution is to employ separate video encoders, one for each different encoding of the video signal, which is expensive due to the multiplicity of hardware.

The present invention advantageously addresses the above needs and other needs.

SUMMARY OF THE INVENTION

The present invention advantageously addresses the needs above as well as other needs by providing a system, apparatus and method for receiving an input signal and encoding the input signal into multiple outputs, each output being an encoded version of the input video signal at least partially encoded according to parameters unique to that output.

In one embodiment the present invention provides a video data compression system that comprises a common encoder module configured to receive an input signal and to generate an intermediate signal; a first encoding channel module coupled with the common encoder module, wherein the first encoding module is configured to receive the intermediate signal and to generate a first encoded output signal from the intermediate signal based on a first set of attributes; and a second encoding channel module coupled with the common encoder module, wherein the second encoding module is configured to receive the intermediate signal and to generated a second encoded output signal from the intermediate signal based on a second set of attributes.

In another embodiment the present invention can be characterized as a method for use in encoding video signals representing a series of frames, comprising: receiving a video input signal having frames; generating a prediction error from a current image and at least one previously generated reference frame; encoding the prediction error based on a first set of attributes producing a first encoded output; and concurrently encoding the prediction error based on a second set of attributes producing a second encoded output. The method can further comprise processing the first encoded output to generate a subsequent reference frame.

In another embodiment, the present invention provides an encoding device that comprises an input configured to receive an input signal; encoding circuitry coupled to said input and configured to generate multiple encoded output signals from said input signal; and multiple outputs coupled to said encoding circuitry; each output configured to provide a respective one of said encoded output signals. The encoding device can further be configured such that the encoding circuitry is configured to be reconfigurable to change the encoding of one of said encoded signals.

In still a further embodiment, the present invention can provide a method for use in producing encoded signals, comprising: receiving an input signal; encoding said input signal to produce at least two encoded signals; and outputting said at least two encoded signals.

In one embodiment, the present invention can be characterized as a system for use in viewing video material, comprising: an input receiving a video signal; an encoding device coupled to said input, wherein the encoding device is configured to encode said video signal into at least a first encoded signal and a second encoded signal; a first display system coupled to said encoding device and receiving said first encoded signal, said first display system decoding said first encoded signal to produce a first video display signal, said first display system displaying said first video display signal; and a second display system coupled to said encoding device and receiving said second encoded signal, said second display system decoding said second encoded signal to produce a second video display signal, said second display system displaying said second video display signal.

The present invention can further be defined by the following features. A first output is produced by video encoder circuitry including a motion estimator, a motion compensator, a differentiator, a transformer, a quantizer, a scanner, an encoder, a buffer, a local decoder, and a control configured in a closed loop with feedback of the encoder output to the local decoder. Each additional output is produced by additional circuitry, equivalent or identical to one or more of the circuit elements listed previously.

In one embodiment, encoding circuit elements listed previously, except for the controller, are duplicated in parallel and packaged as part of the same semiconductor chip. The controller is connected to each duplicated video encoder for independent control of the outputs.

In another embodiment, each additional output is implemented by an additional quantizer, scanner, encoder, and buffer, at least one of which is connected to the controller. Compared with the circuitry producing the first output, however, the circuitry for each additional output is typically implemented in an open circuit fashion because the encoder output is not fed back to the local decoder.

In other embodiments, each additional output can be implemented with different selections of the previously listed circuit elements.

A better understanding of the features and advantages of the present invention will be obtained by reference to the following detailed description of the invention and accompanying drawings, which set forth illustrative embodiments in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

Figure 1:
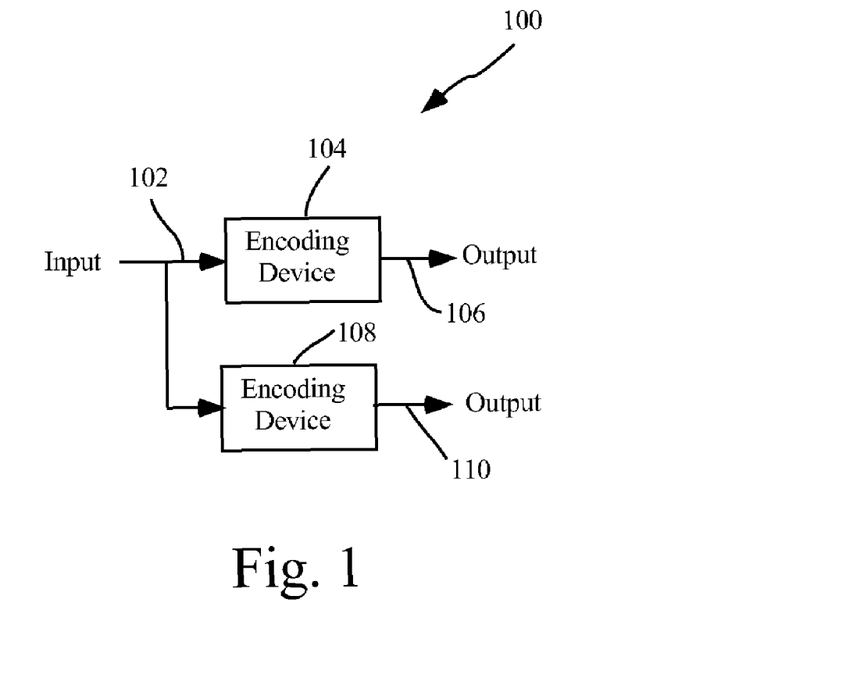
FIG. 1 shows a high level block diagram of a video encoding system having two independent outputs according to one embodiment.

FIG. 1 shows a high level block diagram of a video encoding system 100 having two independent outputs according to one embodiment. The system 100 includes an input signal 102, two encoding devices 104 and 108, and two output signals 106 and 110. The input signal 102 is received by both the first and second encoding devices 104, 108. A first encoding device 104 generates a first output signal 106 and a second encoding device 108 generates a second output signal 110.

The input signal 102 is a digital electronic signal. In one embodiment, the input signal 102 is a digital electronic signal transmitting continuously variable video or movie information. Further to this embodiment, the input signal 102 represents video information by a continuous stream of data representing pictures, each picture represented by a predetermined number of picture elements ("pixels") per line and lines per picture. Pixels are coded as luminance and two color difference components, generally denoted as Y, $C_B$, and $C_R$, respectively. Pictures are generally broken up into "blocks." Blocks are rectilinear groups of pixels, generally 8 by 8 in number.

In operation, the first encoding device 104 receives the input signal 102 and performs processing on the input signal 102 to produce the first encoded output signal 106. The processing performed on the input signal 102 by the first encoding device 104 can include, but is not limited to, lossless compression and lossy compression. Additionally, the processing can include, but is not limited to, encryption and the addition of other information, if desired. In the embodiment of FIG. 1, the second encoding device 108 is a duplicate of the first encoding device 104 and similarly produces the second output signal 110; however, the processing performed by the first encoding device 104 is independent of that performed by the second encoding device 108 and, thus, the attributes and characteristics of the output signals 106 and 108 can be different.

Figure 2:
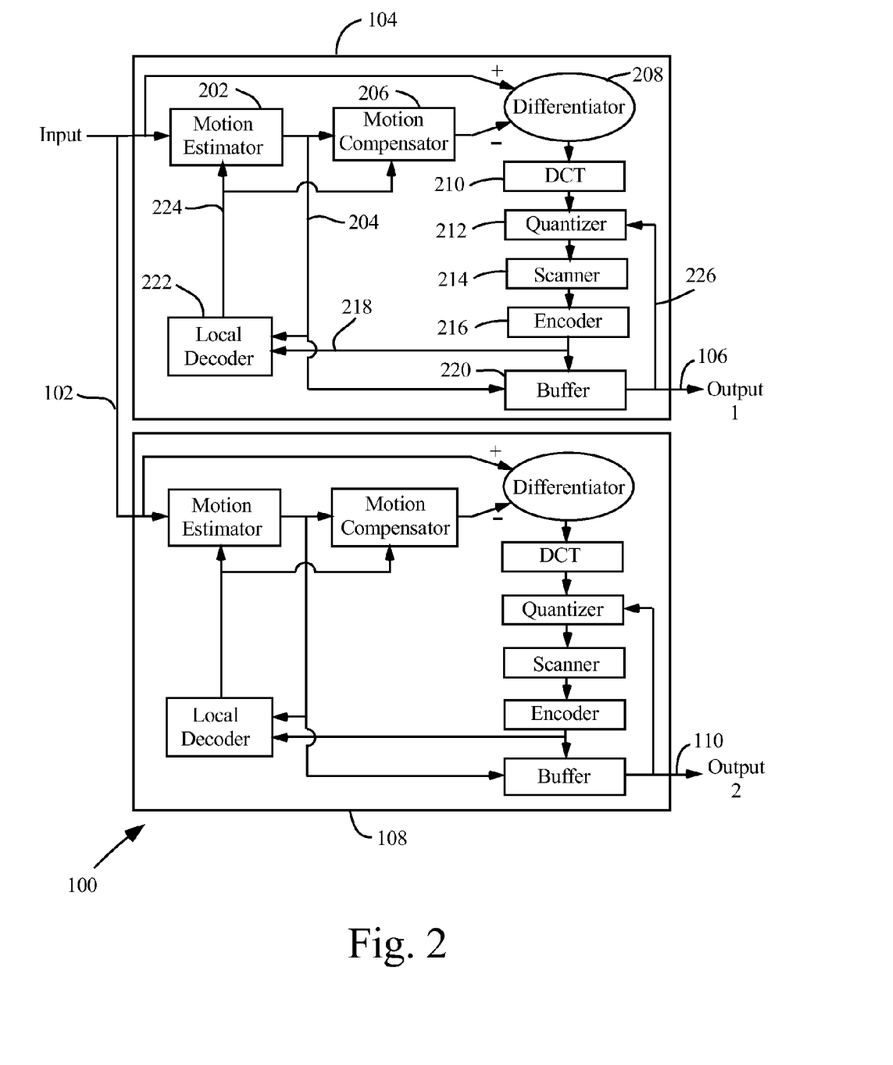
FIG. 2 shows a block diagram with greater detail of the video encoding system of FIG. 1.

FIG. 2 shows a simplified block diagram of the video encoding system 100 of FIG. 1 with one implementation of the first and second encoding devices 104, 108 according to one embodiment of the present invention. The system 100 receives the input signal 102, which is encoded by the first and second encoding devices 104 and 108 to produce the first and second output signals 106 and 110, respectively. In one embodiment, the first encoding device 104 is configured to include a motion estimator 202, a motion vector signal 204, a motion compensator 206, a differentiator 208, a discrete cosine transformer (DCT) 210, a quantizer 212, a scanner 214, an encoder 216, an encoded signal 218, a buffer 220, a local decoder 222, and a reference picture signal 224. In this embodiment, the second encoding device 108 is configured substantially identical to the first encoding device 104. Because of the similar configuration and for simplicity, only the operation of the first encoding device is described.

The motion estimator 202 receives the input signal 102 and is coupled to the motion compensator 206, and the buffer 220. The motion compensator 206 is coupled to the differentiator 208. The differentiator 208 is coupled to the DCT 210. The DCT 210 is coupled to the quantizer 212. The quantizer 212 is coupled to the scanner 214. The scanner 214 is coupled to the encoder 216. The encoder 216 is coupled to the buffer 220 and the local decoder 222. The buffer 220 is coupled to the quantizer 212 and generates the output signal 106. The local decoder 222 is coupled to the motion estimator 202 and the motion compensator 206.

In operation, the motion estimator 202 receives a picture from the input signal 102 and a reference picture signal 224, generated by the local decoder 222 through a feedback loop. The motion estimator generates a motion vector based on the input signal and reference picture for each block within the picture. A reference picture is the decoded picture produced by the local decoder 222 from the encoded version of a previous input picture. A generated motion vector is generally a 2 element vector representing the two dimensional displacement of a block in a picture as compared with the best match for the block in the reference picture. In some preferred embodiments, the encoding device 104 is periodically reset by forcing the reference picture used by the motion encoder 202 and the motion compensator 206 to all zero values. This generates periodical intra-coded pictures which allow a receiver (decoder) to resynchronize to a new stream without inter-picture dependency at initial startup time. It also helps avoiding the possibility of excessive drift due to compounding of errors. The periodic reset to avoid excessive compound errors is fully discussed in detail in reference to FIG. 5, later herein.

The motion estimator 202 outputs the motion vectors in the motion vector signal 204. The motion compensator 206 receives the motion vector signal 204 and the reference picture and generates a predicted picture. The differentiator 208 receives both the input signal 102 and the predicted picture from the motion compensator 206. The differentiator 208 computes the difference between an input picture and a corresponding predicted picture and generates a prediction error. The DCT 210 receives the prediction error and processes the prediction error to generate coefficients. In one embodiment, the DCT 210 orthogonally transforms the prediction error into the frequency domain by a discrete cosine transform, thus producing the transformed coefficients. These transformed coefficients are useful in showing both the energy distribution of the predicted error as well as providing a measure of the human perceptible prediction error per frequency.

The transformed coefficients are quantized by the quantizer 212. In one embodiment, the quantization is discriminatorily applied to result in runs of zero values. After quantization, the transformed coefficients are scanned by the scanner 214. In one embodiment, the scanner is a zig zag scanner and performs the scanning in a zig zag fashion to produce pairs of runs of zero values and non-zero values. After quantization and scanning, the coefficients are received by the encoder 216 and are encoded. The encoding scheme used can be, but is not limited to, Huffman encoding which uses statistical methods, and arithmetic coding. To this end, in one embodiment, the encoder 216 is an entropy encoder. The encoder 216 outputs the encoded signal 218. Both the buffer 220 and the local decoder 222 receive the encoded signal 218.

The buffer 220 receives the encoded signal, buffers it, and provides it as the output signal 106. In some embodiments, the buffer's occupancy level 226 (generated separately from the output signal 106) is fed back to the quantizer 212 providing a control function, for example, by multiplying a factor X and adding an offset Y, to form a negative feedback loop. In some embodiments a higher buffer occupancy level results in commands to the quantizer 212 causing coarser quantization resulting in a reduced data rate. This feedback to the quantizer 212 is referred to below as the quantization feedback.

The local decoder 222 receives both the motion vector signal 204 and the encoded signal 218 and uses these signals to produce the decoded reference picture signal 224. The local decoder 222 is preferably the same decoder used in at least one end device receiving the first output 106 such as a High Definition Television (HDTV) or other video display devices. Using the same decoder for the local decoder 222 as used in end display devices helps to optimize encoding to result in an optimal display on the end display device. The reference picture signal 224 is received by both the motion estimator 202 and motion compensator 206 providing the reference pictures used by those devices as previously described.

The internal components of the second encoding device 108 are typically configured to function similar to the internal components of the first encoding device 104 as described previously. However, different parameters can be utilized to achieve a desired encoding. The first and second output signals 106, 110 are not required to be the same, and depend on the relative configurations of the internal modules such as the DCT 210, the quantizer 212, and the encoder 216 a plurality of different encodings of the same input signal are achieved.

Use of multiple encoding circuits in parallel provides the ability to produce a like number of outputs, each capable of having different encoding characteristics or attributes. Having outputs capable of having different encoded attributes is beneficial as different end display devices can be supplied with outputs tailored to their needs. For example, different end user devices may optimally require different bit rates. As such, the first encoder 104 can provide a first encoded output 106 of the input signal 102 at a first bit rate, and the second encoder 108 can provide a second output 110 at a second bit rate. Another benefit is that users can, when available, configure end display devices to display the received output differently, which may optimally require the received output to have different characteristics. By way of example, a television may, when displaying a full screen view of a video signal, benefit from a first set of encoding characteristics. If the viewed video signal is relegated to a smaller window taking up a fraction of the full screen space, a configuration often called picture in picture, the optimal encoding scheme for the smaller window's signal is likely to differ from the first set of encoding characteristics, such as allowing for lowered resolution. Reducing the resolution, when necessary or desirable, is beneficial in saving bandwidth as compared with the signal destined for the full screen use.

In one embodiment, the encoding devices 104 and 108, while intended for use in parallel, are separately and independently manufactured. In another embodiment, the encoding devices 104 and 108 are fabricated from the same physical carrier, such as on the same semiconductor chip. Placement of the circuitry for producing multiple encoded outputs a single chip reduces the costs of manufacturing devices providing two or more encoded outputs.

Figure 3:
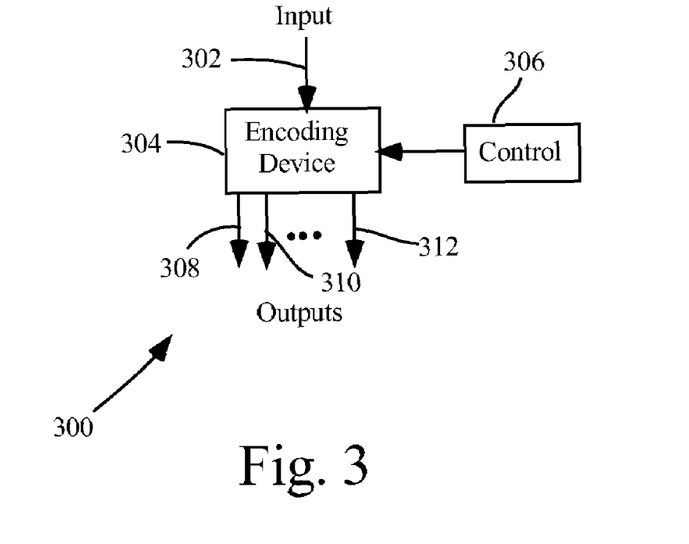
FIG. 3 shows a high level block diagram of a video encoding system having multiple outputs according to another embodiment.

FIG. 3 shows a high level block diagram of a video encoding system 300 having multiple outputs 308, 310, 312 according to another embodiment of the present invention. The encoding system 300 includes an input signal 302, an encoding device 304, a control 306, and output signals 308, 310, 312. The encoding system can include substantially any number of outputs. The input signal 302 is received by the encoding device 304. The encoding device 304 is coupled to the controller 306 and generates the output signals 308, 310, 312.

In operation, the encoding device 304 receives the input signal 302 and encodes the input signal 302 into the plurality of output signals 308, 310, 312, such as by the method discussed in reference to FIG. 2. The processing performed by the encoding device 304 in producing the output signals 308, 310, 212 is subject to control by the controller 306. In one embodiment, the controller 306 is able to independently set the processing characteristics of the internal modules of the encoding device 304, so that at least one of the output signals 308, 310, 312 can be independently controlled. For example, if the circuitry shown in FIG. 2 is employed, the quantizer 212 can be configured to have a different feedback factor based on buffer occupancy level 226 which affects the bit rate and picture quality.

The independent control of one or more encoded output signals 308, 310, 312 allows the encoded output signals to be configured to efficiently use the processing power of both the encoding device 304 and the decoding device in the end use device, optimize transmission bandwidth, as well as other characteristics and/or attributes to optimize encoding, transmission and decoding of the input signal to one or more display devices.

For example, some end use devices, such as a smaller digital television or an analog television, do not require or cannot utilize the same amount of detail as a larger HDTV, and thus, the signals sent to them can have lower detail and/or resolution. As a second example, televisions offering multiple window capabilities generally allow one channel to occupy most of the screen while a second channel is displayed in a small window.

If such a television is displaying the same video source signal in its small window as is being watched on a large television elsewhere and both are being supplied by the same encoding device 304, then the output being displayed in the small window on the one television can be encoded to contain less information due to the lower resolution required. This lowers the processing required in the encoding device 304 and saving bandwidth on the connection serving that television.

Further, some systems may have limited communication bandwidths. The coupling or communication channel connecting the encoding system 300 (or signal source incorporating the multiple output encoding system 300 of the present invention) and the one or more displaying devices (e.g., television, computer and the like) may not have a sufficient bandwidth to carry a full definition picture to the display devices. For example, the communication channel can be a wireless communication channel that has a limited bandwidth.

Figure 4:
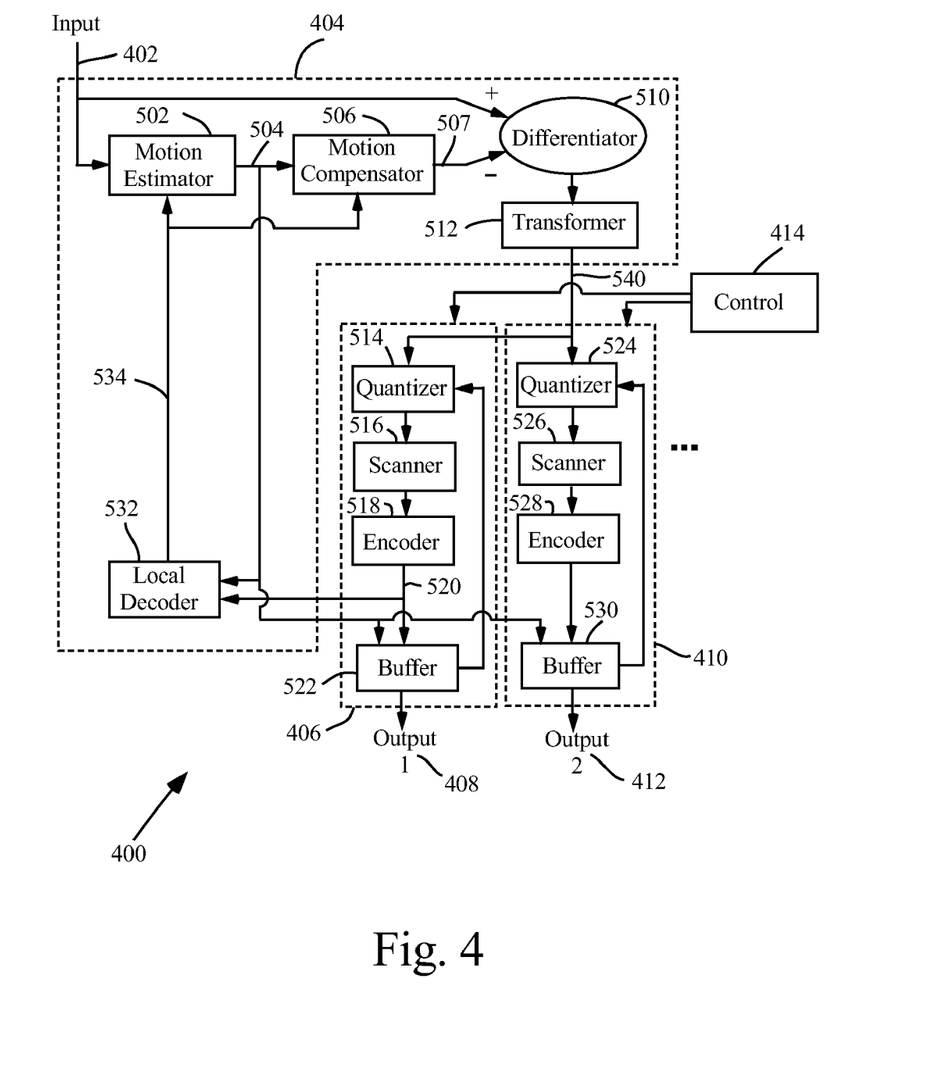
FIG. 4 shows a simplified block diagram with greater detail of a video encoding system similar to the system shown in FIG. 3.

FIG. 4 shows a high level block diagram of a video encoding system 400 having multiple outputs according to one embodiment of the present invention. The encoding system 400 includes a common encoder module 404, a plurality of separate encoding channel modules 406, 410, a channel controller 414 and a plurality of outputs 408, 412 providing a plurality of output signals.

The common encoder encoding module 404 receives the input signal 402, and is coupled to the plurality of separate channel modules 406, 410. The channel controller 414 is coupled to each separate channel module 406, 410. A first encoding channel module 406 generates a first output 408 and a second encoding channel module 410 generates a second output 412. The first channel module 406 additionally couples back with the common encoding module 404 providing feedback.

The common encoding module 404 receives the input signal 402 and partially processes the input signal 402 according to the method discussed in reference to FIG. 2 and produces an intermediate signal 540. The common encoding module 404 provides the intermediate signal 540 to the first channel module 406 and the second channel module 410. In one embodiment, the common encoding module 404 contains a motion estimator 502, a motion compensator 506, a differentiator 510, a DCT or other transformer 512, and a local decoder 532. The channel modules 406 and 410 each contain a quantizer 514, 524, a scanner 516, 526, an encoder 518, 528, and a buffer 522, 530.

Referring back to FIGS. 1 and 2, in terms of the amount of processing power and/or processing time required to encode signals, the most expensive components of the encoding device 104 are generally the motion estimator 202, the local decoder 222, and the motion compensator 206. Additionally, those components of the encoder that allow a signal to be optimized, (e.g., tuned the most efficiently for bandwidth use goals, end device display size, bit rate requirements, end use display type, and the like) are generally the quantizer 212, scanner 214, and encoder 216.

As such, the embodiment of the present invention shown in FIG. 4 utilizes the common encoding module 404 to incorporate the more processing costly components, while the separate encoding channel modules 406, 410 include the components that more easily adjust the characteristics of the encode output signal. The intermediate signal 540 passed from the common encoding module 404 to each of the channel modules 406 and 408 is a differential signal of the predicted picture from the motion compensator 506 and the input signal 402, that is transformed to produce the coefficients signal. Similarly, the outputs 408 and 412 each comprise two signals, the motion vector signal 504 and an entropy encoded signal 520 produced by the encoder.

The coupling back of the entropy encoded error signal 520 generated from the first channel module 406 to the common encoding module 404 allows for feedback of the entropy encoded signal. Thus, the common encoding module 404 and the first channel module 406 combine to form a closed loop circuit. This feedback prevents cumulative error drift in the first output 408.

In this embodiment those components that are generally the most expensive in terms of processing load are positioned in the common encoding module 404, while those components that are generally most useful for altering the characteristics and/or attributes of an individual output signal 408 and 410 are positioned into the separate channel modules 406 and 410. Other embodiments, however, can have different configurations of which components are located in the common encoding module 404 and which components are located in the channel modules 406 and 410 as best suited for pre-defined design goals or requirements.

When more than one differently-encoded outputs are being generated by the video encoding system 100, generally, the output having the highest bit rate is chosen to be generated by the first channel module 406 so that the feedback to the common encoding module 404 contains the most accurate information.

The controller 414 can independently reconfigure one or more of the channel modules 406 and 410 as desired, as discussed in reference to FIG. 3, depending on the desired end use of the output signals 408 and 412. The controller can reconfigure based on changes to the receiving device, a received reconfigure command or input, changes to the input signal or other such parameters.

In some embodiments, the common encoder module 404 and separate encoding channel modules 406 and 410 are implemented through hardwire circuit configurations. Alternatively, components of or the entire common encoder module 404 can be implemented through software. Similarly, parts of or all of the separate encoding channel modules 406, 410 can be implemented through software. The software can be implemented through a processor, micro-processor, a reduced instruction set computer (RISC) engine, a digital signal processor (DSP), a media processor or other similar processors.

Figure 5:
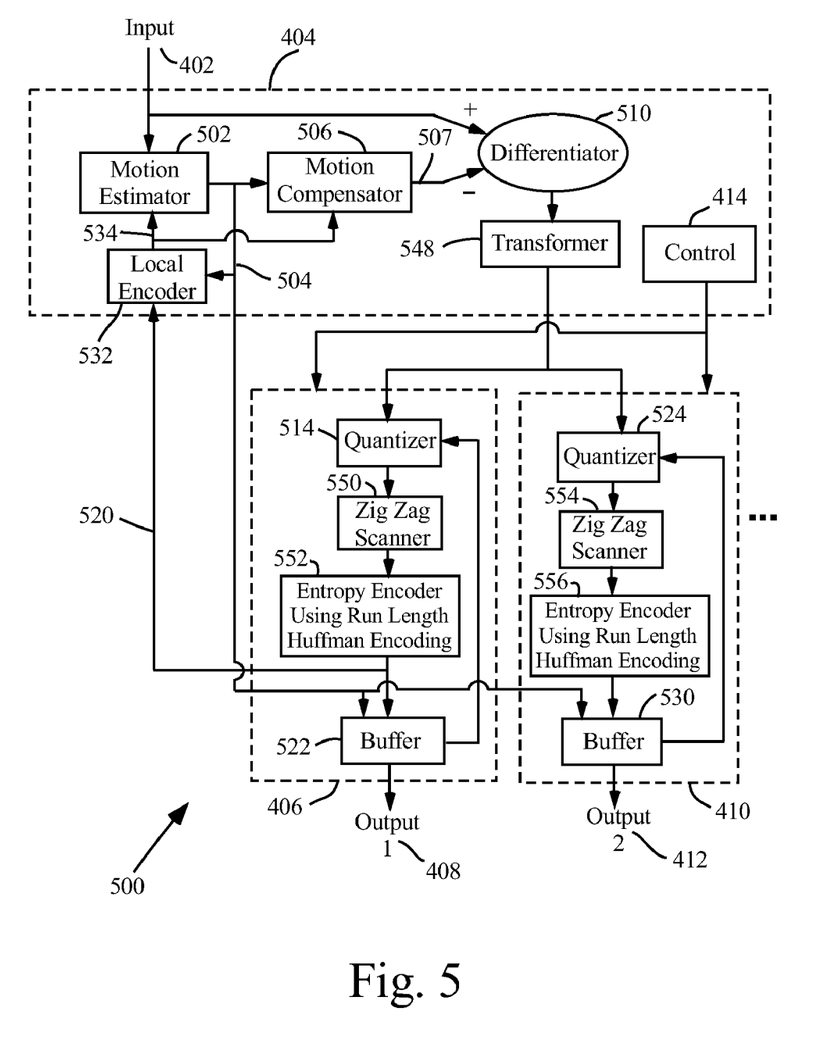
FIG. 5 shows a simplified block diagram of an alternate embodiment for the video encoding system of FIG. 4.

FIG. 5 shows a simplified block diagram with greater detail of the video encoding system 400 of FIG. 4. The system 500 includes an input signal 402, a common encoding module 404, a plurality of channel modules (for example, first and second modules 406, 410), a controller 414 and outputs 408 and 412. The common encoding module 404 further includes a motion estimator 502, a motion vector signal 504, a motion compensator 506, a differentiator 510, and a domain translator or orthogonal transformer 548. The internal components of the first and second separate components 406, 410 include quantizers 514, 524, scanners 550, 554, encoders 552, 556 and buffers 522, 530, respectively. Additional channel modules can be incorporated into the system 500 as indicated by the ellipsis. Referenced signals shown are a motion vector signal 504, an entropy encoded signal 520, and a reference picture signal 534. In some embodiments, the scanners 550, 554 are implemented with zig zag scanners. Additionally, the encoders 552, 556 can be implemented through entropy encoders, and the transformer can be a DCT transformer.

The motion estimator 502 receives the input signal 402, generates the motion vector signal 504, and is coupled to the motion compensator 506, the first buffer 522, and second buffer 530. The motion compensator 506 couples with the differentiator 510. The differentiator 510 also directly receives the input signal 402 and is coupled to the transformer 548. The transformer 548 is coupled to both quantizers 514, 524. The first quantizer 514 is coupled to the first scanner 550 which in turn is coupled to the first encoder 552. The first encoder 552 is coupled to both the first buffer 522 and the local decoder 532 and generates the entropy encoded signal 520. The first buffer 522 is coupled to the first quantizer 514 and outputs the first output signal 408. The second quantizer 524 is coupled to the second scanner 554 which in turn couples with the second encoder 556. The second encoder 556 is coupled to the second buffer 530 but is not coupled to the local decoder 532. The second buffer 530 is also coupled to the motion estimator 502 and outputs the second output signal 412 concurrently with the first output signal.

In one embodiment, the video encoding system 400 operates similarly to the embodiment described for the encoding device 104 of FIG. 2, with some modification. One modification is that instead of complete duplication of all of the circuitry for encoding a signal, the video encoding system 500 reduces the duplication of circuitry by having the common encoding module 404, for circuitry that is shared. The video encoding system 500 can have some duplication of circuitry as shown by the two separate encoding channel modules 406 and 410, each comprising a quantizer, a scanner, an encoder, and a buffer. Another difference between the video encoding system 500 and the video encoding system 100 described in reference to FIG. 2 is that the video encoding system 500 of FIG. 5 includes the controller 414, coupled to both of the first and the second channel modules 406 and 410, for control or adjustment of the operating characteristics and/or attributes of at least one of the internal components or circuits of at least one of the first and second channel modules 406 and 410.

In operation, the motion estimator 502 generates a motion vector signal 504 including motion vectors for each of one or more blocks within a picture. Periodically the encoding system 400 is reset by forcing the reference picture used by the motion encoder 502 to all zero values, thus resulting in the production of an Intra-picture or I-picture for resynchronization, and the compensation and/or elimination of accumulated errors.

In the closed loop portion of the encoding system 500, the motion estimator 502 uses the input signal 402 and the reference picture signal 534, provided by the local decoder 532, to produce the motion vector signal 504. The motion vector signal 504 and the reference picture signal 534 are received by the motion compensator 506 which applies the received motion vectors to the blocks in the corresponding reference pictures to generate predicted pictures, which are outputted as the predicted picture signal 507. The differentiator 510 compares the predicted picture signal 507 with the actual input signal 402 by computing the difference between an input picture and a corresponding predicted picture. The resultant difference is the prediction error. The transformer 548 receives the prediction error signal and transforms the signal into a transformed error signal. In one embodiment, the transformer 548 uses a discrete cosine transform and produces discrete cosine transform coefficients as discussed in reference to FIG. 2. In one embodiment, the transformer 548 orthogonally transforms the prediction error into the frequency domain by a discrete cosine transform and produces transformed coefficients. In this embodiment, the output of the transformer 548 is the intermediate signal 540 that is provided as input to the first and second channel modules 406, 410.

In the first channel module 406, the first quantizer 514 receives the transformed coefficients and produces a quantized coefficient signal. In one embodiment, the quantization is discriminatorily applied to result in runs of zero values. Depending on the quantization algorithm used, the quantization process can reduce the amount of information retained in the quantized coefficient signal as compared with the original prediction error signal. Reduction of the amount of retained information results in lower bit rates which reduces transmission bandwidth. The controller 414 can modify the feedback factor to the quantizer 514, for example, based on the fullness of buffer 522. Thus, when the output 408 needs to be altered for display on a specific end display device or due to communication channel limitations, the controller 414 alters or affects the negative feedback to increase or decrease the amount of data to be generated.

The scanners 550, 554 receive and scan the quantized coefficients. In one embodiment, the scanners 550, 554 are zig zag scanners and produce pairs of runs of zero values and non-zero values. Zig-zag scanning is a method of run-length encoding of the transformed coefficients of a block. Starting from the upper-left corner, one embodiment of a zig-zag scan proceeds as follows.

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

The encoder 552 receives the scanned code, e.g., run-length code, and produces the entropy encoded signal 520 by assigning symbols statistically. In one embodiment, the encoding scheme used is Huffman encoding. The entropy encoded signal 520 and the motion vector signal 504, produced by the motion encoder 502, are received and used by the local decoder 532 to produce the reference picture signal 534. The reference picture signal 534 is substantially the same signal displayed on an end user device. This is because the local decoder 532 is similar to, and preferably identical to the decoder used in at least one of the end devices, and the two signals received by the local decoder 532, the entropy encoded signal 520 and the motion vector signal 504, are the same signals received by the end device's decoder.

The entropy encoded signal 520, along with the motion vector signal 504 received from the motion estimator 502, are buffered in the first buffer 522 and supplied as the first output 408. As discussed previously, the quantizer 514, in processing the output of the transformer 548, can be dependent on the fullness of the first buffer 522.

The components of the second channel module 410 include the second quantizer 524, the second scanner 554, the second encoder 556, and the second buffer 530. The components of the second channel module process the transformed coefficients of the intermediate signal 540 received from the transformer 548 in a manner similar to the process described for the first channel module 406. The controller 414 controls the configuration of the second quantizer 524, scanner 554, encoder 556, and buffer 530, and thus, the second output 412 can be reconfigured and/or tailored to the needs of an alternate end display device which receives the second output 412 (e.g., bit rate, resolution, and the like). It is noted that the encoder 556 of the second channel module 410 does not have a feedback connection to the motion estimator 502 as does the first encoder 552 of the first channel module 406. However, the present invention can be configured to utilize a plurality of feed backs.

Further to the embodiment shown in FIG. 5, additional channel modules similar to the second channel module 410 can additionally be included in the system 500. These additional separate channel modules, as with the second channel module 410, typically do not include feedback connections from their encoders back to the motion estimator 502.

Because the first entropy encoded error signal 520 is fed back to the common encoding module 404, and is utilized in the production of a following iteration of the predicted error signal inputted to the first channel module 406, there is no compound error in the first output 408 of the first channel module 406. In contrast, the second channel module 410 does not have a feedback loop to the common encoding module 404 for its entropy encoded signal. Thus, the quantization feedback loop for the second channel module 410 can accumulate some minor compounded error resulting in some accuracy drift. However, this prediction drift accumulation is minor because limited GOP size (Group of Pictures size). Further, the periodic Intra (I) pictures reduce and/or eliminate accumulated error. At a high level, the encoding system 400 can be viewed as a closed loop circuit comprising the common encoding module 404 and the first channel module 406 and an open loop circuit comprising the common encoding module 404 and the second channel module 410.

Figure 6:
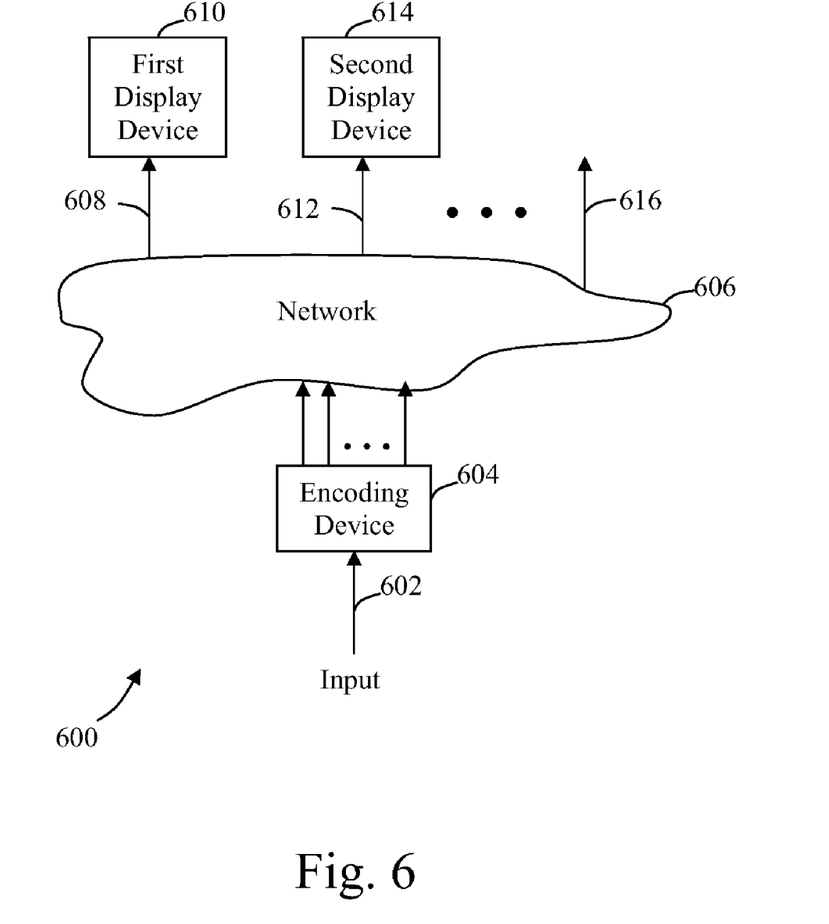
FIG. 6 shows a block diagram of a network utilizing a multiple-output video encoder according to another embodiment.

FIG. 6 shows a high level block diagram of a media system 600 utilizing a multiple-output video encoding system 604 according to one embodiment of the present invention.

The media system 600 is configured to include an encoding system 604 coupled with a network 606. The network 606 further couples with a first display device 610 and a second display device 614. The network can be a local network, an intranet, a distributed network (such as the Internet) or other networks and/or combinations of these and other networks. The encoding system 604 is an encoding system according to the present invention, such as encoding system 300, 400 and 500 shown in FIGS. 3, 4 and 5, respectively. Also shown are an input signal 602, a first encoded transmission signal 608, and a second encoded transmission signal 612.

In operation, the encoding system 604 receives the input signal 602, which typically comprises a video signal, and produces one or more encoded outputs 608, 612, 616 as desired. The encoded outputs 608, 612, 616 are transmitted over the network 606, where for example the first output 608 is received by the first display device 610, and the second output 612 is received by the second display device 614.

Applications suitable for the media system 600 include, but are not limited to, video distribution within houses or homes, schools, colleges, universities, businesses, and so forth. The media system 600 can be used within a single room, over multiple rooms in a building or multiple buildings, in one vehicle, over several vehicles, externally, or any combination of the preceding, for example. Additionally, the configuration of the system 600 can be dynamic. As an example, the system 600 could be an audio-video system in a university center allowing students to connect to the network 606 as desired or when in range, and further allowing them to disconnect when desired. The system 600 could utilize any combination of wireless couplings, such as, but not limited to, 802.11a, 802.11b, Bluetooth, or so on, or wired couplings such as, but not limited to, ethernet, as desired. Another example of a use for the system 600 is in a residential house or home.

Figure 7:
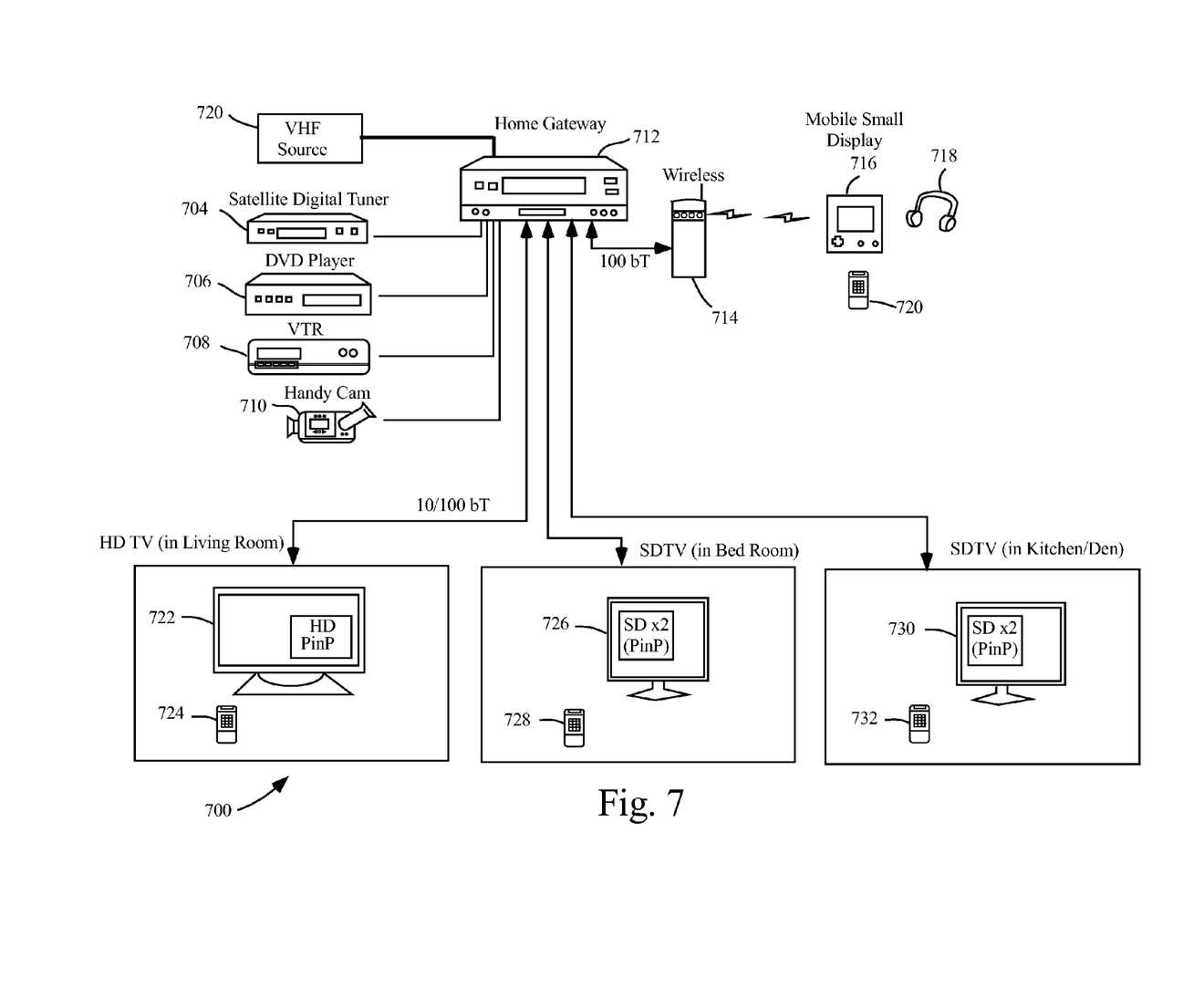
FIG. 7 shows a block diagram of a network utilizing a multiple-output video encoder according to another embodiment.

FIG. 7 shows a block diagram of a media system 700 having legacy components and utilizing a multiple-output video encoder according to an embodiment of the present invention. The system 700 comprises a very high frequency (VHF) source 702, a satellite digital tuner 704, a digital versatile disc (DVD) player 706, a video tape recorder (VTR) 708, a handy camcorder 710, a home gateway 712, a wireless transmitter 714, a mobile small display (MSD) 716, a headphone 718, remotes 720, 724, 728 and 732, a high definition television (HDTV) display 722, a first standard definition television (SDTV) 726, and a second SDTV 730. The VHF source 702, the satellite digital tuner 704, the DVD player 706, the VTR 708, and the handy cam 710 are all coupled to the home gateway 712. The home gateway 712 is coupled to the wireless transmitter 714. The wireless transmitter 714 is wirelessly coupled to the MSD 716 and the headphone 718. The MSD 716 is additionally coupled to the MSD remote 720. The home gateway 712 is further coupled to the HDTV display 722, the first SDTV 726, and the second SDTV 730. The HDTV display 722 is coupled to the HDTV remote 724. The first SDTV 726 is coupled to the first SDTV remote 728. The second SDTV 730 is coupled to the second SDTV remote 732.

The wireless coupling between the wireless transmitter 714 and the MSD 716 can use substantially any wireless communication format, such as, but is not limited to, formats 802.11a, 802.11b, radio frequency, Bluetooth and other such wireless coupling. The coupling between the wireless transmitter 714 and the headphone 718 is also wireless and can be, but is not limited to, a radio frequency connection. Note that the couplings between the wireless transmitter 714 and the MSD 716 and the headphone 718 can be intermittent as communications typically are not always being transmitted over the wireless links. For example, if the MSD 716 is powered off, the coupling between the wireless transmitter 714 and the MSD 716 will be temporarily non-functioning. The couplings between the various remotes 720, 724, 728, and 732 and the respective devices to which they interface are also typically wireless, and can be implemented through infrared, Bluetooth, radio frequencies, and other wireless communication techniques. As with the other wireless connections, the couplings between the various remotes 720, 724, 728, and 732 and the respective devices to which they interface can be intermittent, especially as communications over these couplings are generally dependent on initiation and/or interaction from a user.

The system 700 is one embodiment of a typical audio-visual system used in such places as, but not limited to, homes, houses, hotels and motels, businesses and offices, conference locations, schools, colleges and other facilities or locations. In operation, the VHF source 702, the satellite digital tuner 704, the DVD player 706, the VTR 708, and the handy cam 710 all can provide video input to the home gateway 712. In this embodiment, the VHF source 702, the satellite digital tuner 704, the DVD player 706, the VTR 708, and the handy cam 710 are all legacy equipment. For example, the VHF source 702 can be an input such as, but not limited to, a VHF antenna or a VHF cable input. Additionally, the satellite digital tuner 704, the DVD player 706, the VTR 708, and the handy cam 710 can be legacy equipment and may have separate composite video or S-video and accompanying audio R-L outputs. In order to receive the inputs from these legacy components, the home gateway 712 has legacy inputs for connecting to these components and the circuitry necessary to convert these inputs into digital format. The gateway 712 can additionally be configured with other inputs, interfaces, and/or connectors for other legacy as well as non-legacy devices.

The home gateway 712 is configured as a network hub, such as an ethernet-based local area network hub; The home gateway 712 can communicate with the wireless transmitter 714 under, for example, the 100 base-T specification. The home gateway 712 can further communicate with the HDTV display 722, the first SDTV 726, and/or the second SDTV 730 under, for example, the 10/100 base-T specification. The home gateway 712 contains, in one embodiment, an encoding device similar to the encoding device 400 as described in reference to FIGS. 4-5.

The HDTV 722 can be located in a first location or room, for example in the living room, and is capable in this system configuration of providing the highest quality video display of any component in the system 700. It will be apparent to those skilled in the art that other devices proving higher quality or other devices utilizing higher data input demands can be utilized. The first SDTV 726 is located in a second location or room, for example in a bed room, and the second SDTV 730 is located in a third location or room, for example in the kitchen or den. When operating, the encoding device 400, located in the home gateway 712, is capable of supplying the same video source to several different end devices, where each signal can have different encoding characteristics when needed.

As an example, the DVD player 704 is playing a movie DVD being displayed on the HDTV 722 in the living room. For the purposes of this discussion, reference is made to the encoding device 400 of FIGS. 4-5. The signal supplied from the encoding device 400 to the HDTV 722 is the first output 408, shown in FIGS. 4-5, and is encoded so as to take full advantage of the capabilities of the HDTV 722. If someone in the kitchen desires to watch the same movie, this is communicated to the home gateway 712 and a second encoded signal of the movie is transmitted to the first SDTV 730 as well. For this encoding device output, the encoding device 400 might use the second output 412 and encode the second output having different attributes than the first output 408 so as to take advantage of the capabilities of the first SDTV 730. As the first SDTV 730 is not capable of the same high resolution as the HDTV 722, the signal to the first SDTV 730 can be encoded to take advantage of this, such as by reducing the resolution which results in less bandwidth use than required for the first output 408 going to the HDTV 722. Similarly, if a person in the bedroom wants to keep the DVD movie showing in a small window in the corner of the second SDTV display 726, the encoding device 400 provides (in an embodiment with at least three separate outputs) a third output for the second SDTV 726 which is configured to take advantage of the lower resolution of the smaller display size, and thus much less bandwidth would be used as compared with the first and second outputs displayed on the HDTV 722 and the SDTV 730. Further, if any device which was displaying the movie stopped displaying the movie, the output which had been supplying that device becomes available for use with another device which later begins displaying the movie. In such a case where a previously used output is chosen to begin supplying a new device, the circuitry supplying that output is reconfigured by the controller 414 to match the encoding needs of supplying the device.

Figure 8:
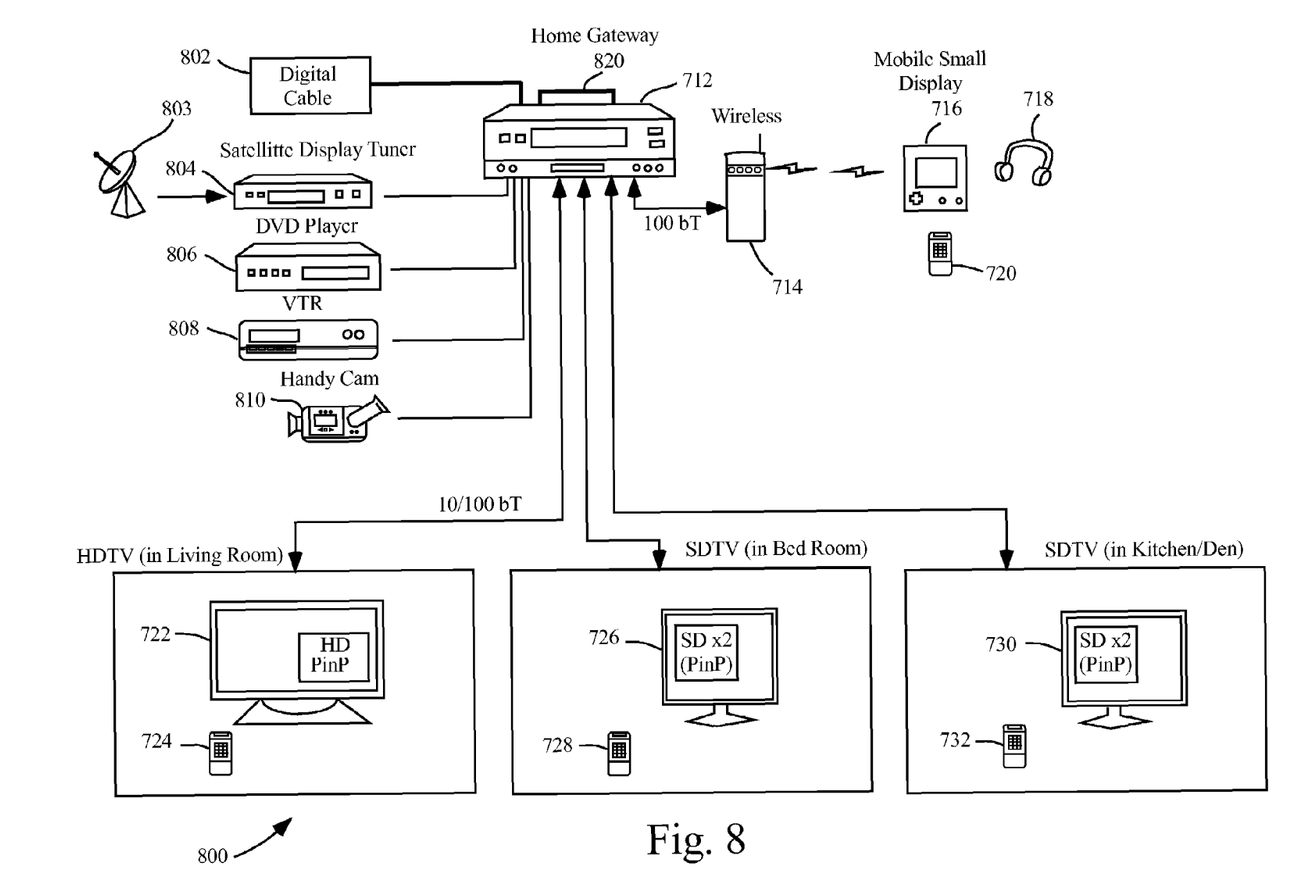
FIG. 8 shows a block diagram of a network utilizing a multiple-output video encoder according to another embodiment.

FIG. 8 shows a block diagram of a system 800 utilizing a multiple-output video encoder according to an embodiment of the invention, such as the encoding device 400 of FIGS. 4-5. The system 800 is similar to the system 700 shown in FIG. 7; however, the system 800 utilizes one or more digital sources. The system 800 comprises a digital source 802, a satellite dish 803, a satellite digital tuner 804, a DVD player 806, a digital VTR 808, a digital camcorder 810, a home gateway 712, a wireless transmitter 714, an MSD 716, a headphone 718, remotes 720, 724, 728 and 732, a HDTV display 722, a first SDTV 726, and a second SDTV 730.

The digital source 802, the satellite digital tuner 804, the DVD player 806, the digital VTR 708, and the digital camcorder 810 are all coupled with the home gateway 712. The satellite dish 803 is coupled to the satellite digital tuner 804. The satellite digital tuner 804, the DVD player 806, the digital VTR 708, and the digital camcorder 810 are all digital devices and each of these devices communicates in a digital format with the home gateway 712. It is noted that as the input devices communicate by digital transmission, there is likely greater freedom regarding the placement of the home gateway 712 relative to the satellite digital tuner 804, the DVD player 806, the digital VTR 708, and the digital camcorder 810.

The system 800 is shown, in this embodiment, to communicate with digital sources. However, the system 800, home gateway and encoding device 820 (typically associated with the gateway) can be utilized to communicate with all analog sources, all digital sources or a combination of analog and digital sources. The encoding device 820 is capable of providing a plurality of encoded outputs of a single source signal, whether analog or digital, where the plurality of outputs can have different attributes. For example, the encoding device 820 can generate three outputs (e.g., HDTV, first SDTV and second SDTV), each with different attributes. As a further example, the encoding device 820 can generate four outputs, where the first and second outputs both have a first set of attributes, while third and fourth outputs have second and third sets of attributes, respectively. The system 800 can additionally adjust or change encoding attributes or parameters as needed to compensate changes in input signals, changes in devices receiving the signals or changes based on commands to change one or more of the encoded output signals.

While the invention herein disclosed has been described by means of specific embodiments and applications thereof, numerous modifications and variations could be made thereto by those skilled in the art without departing from the scope of the invention set forth in the claims.

What is claimed is:

1. A system for use in video data compression, comprising:
a common encoder module configured to receive and process an input signal and to generate an intermediate signal from the input signal, wherein the intermediate signal comprises prediction error;
a first encoding channel module coupled with the common encoder module, wherein the first encoding module is configured to receive the intermediate signal and to encode, based on a first set of attributes, the intermediate signal to generate a first encoded output signal comprising video data encoded based on the first set of attributes; and
a second encoding channel module coupled with the common encoder module, wherein the second encoding module is configured to, in parallel with the first encoding channel module, receive the intermediate signal and to encode, based on a second set of attributes, the intermediate signal to generate a second encoded output signal comprising the video data encoded based on the second set of attributes.

2. The system of claim 1, wherein the intermediate signal includes transformed coefficients.

3. The system of claim 2, wherein the first encoding channel module and the second encoding channel module operate concurrently to generate the first and second encoding output signals, respectively.

4. The system of claim 3, wherein the first encoding channel module includes a first quantizer coupled with a first scanner, and the first scanner further couples with a first encoder; and the second encoding channel module includes a second quantizer coupled with a second scanner, and the second scanner further couples with a second encoder.

5. The system of claim 4, wherein the common encoder module includes a motion estimator, a motion compensator, a differentiator, a transformer and a local decoder.

6. The system of claim 4, wherein an output of the first encoder is fed back to the common encoder module.

7. The system of claim 1, further comprising:

an input configured to receive the input signal;

the common encoder module includes:

a motion estimator coupled to said input, said motion estimator configured to output a motion estimate signal comprising estimates of respective motions of at least one portion of said video signal;

a motion compensator coupled to said motion estimator and a local decoder, said motion compensator configured to receive said motion estimate signal and a decoded video signal from said local decoder, said compensator further configured to output a predicted video signal;

a differentiator coupled to said input and said motion compensator, said differentiator configured to compare said video signal with said predicted video signal and to output a prediction error signal; and a domain translator coupled to said differentiator, said domain translator is configured to translate said prediction error signal and to output the intermediate signal including translated errors;

the first encoding channel including:

a first quantizer coupled to said domain translator, said first quantizer configured to quantize said intermediate signal and to output a first quantized coefficient signal;

a first scanner coupled to said first quantizer, said first scanner configured to scan said first quantized coefficient signal and to output a first scanned code; and a first encoder coupled to said first scanner and said local decoder, said first encoder configured to encode said first scanned code and to output a first encoded signal, said local decoder is coupled additionally to said motion estimator, said local decoder is configured to receive said motion estimate signal and said first encoded signal and to output said decoded video signal; and the second encoding channel including:

a second quantizer coupled to said domain translator, said second quantizer configured to quantize said intermediate signal and to output a second quantized coefficient signal;

a second scanner coupled to said second quantizer, said second scanner configured to scan said second quantized coefficient signal and to output a second scanned code; and a second encoder coupled to said second scanner, said second encoder is configured to encode said second scanned code and to output a second encoded signal, at least one of said second quantizer, said second scanner, and said second encoder being independently configurable from said first quantizer, said first scanner, and said first encoder.

8. The system of claim 7, further comprising:

a first buffer coupled to said first encoder, said motion estimator, and said first quantizer, said first buffer configured to buffer said first encoded signal and said motion estimate signal; and a second buffer coupled to said second encoder and said motion estimator, said second buffer configured to buffer said second encoded signal and said motion estimate signal.

9. The system of claim 8, wherein at least one of said first and second scanners comprise a zig zag scanner.

10. The system of claim 9, wherein at least one of said first and said second encoders comprise an entropy encoder.

11. A method for use in encoding signals representing a series of frames, comprising:

receiving a video input signal having frames;

generating a prediction error from a current image and at least one previously generated reference frame;

encoding through an encoding system the prediction error based on a first set of attributes producing a first encoded output;

concurrently encoding through an encoding system the prediction error based on a second set of attributes producing a second encoded output; and processing the first encoded output to generate a subsequent reference frame;

wherein the encoding the prediction error based on the first set of attributes comprises encoding the prediction error producing the first encoded output such that the first encoded output is encoded to be displayed by an appropriately configured display device; and wherein the concurrently encoding the prediction error based on the second set of attributes comprises encoding the prediction error based on the second set of attributes, that are different from the first set of attributes, producing the second encoded output such that the second encoded output is encoded to be displayed by an appropriately configured display device.

12. The method of claim 11, wherein the generating a prediction error includes generating a motion vector from a current frame of the input signal; and the processing the first encoded output to generate the subsequent reference frame includes processing the motion vector and the first encoded output to generate the subsequent reference frame.

13. The method of claim 11, wherein the encoding the prediction error based on the first set of attributes includes:

quantizing the prediction error based on the first set of attributes to obtain a first set of quantized coefficients;

scanning the first sets of quantized coefficients producing a first scanned set of quantized coefficients; and applying an encoding scheme on the first scanned sets of quantized coefficients producing the first encoded output; and wherein the encoding the prediction error based on the second set of attributes includes:

quantizing the prediction error based on the second set of attributes to obtain a second set of quantized coefficients;

scanning the second sets of quantized coefficients producing a second scanned set of quantized coefficients; and applying an encoding scheme on the second scanned sets of quantized coefficients producing the second encoded output.

14. The method of claim 13, wherein the generating the prediction error includes generating a motion vector from a current frame of the input signal; and the processing the first encoded output to generate the subsequent reference frame includes processing the motion vector and the first encoded output to generate the subsequent reference frame.

15. The method of claim 14, wherein the generating a prediction error further includes generating a predicted current image frame from the at least one previous reference frame and the motion vector; and generating a set of coefficients by transforming a domain of the prediction error, wherein the quantizing of the prediction error base on the first set of attributes includes quantizing the set of coefficients base on the first set of attributes, and the quantizing of the prediction error base on the second set of attributes includes quantizing the set of coefficients base on the second set of attributes.

16. The method of claim 15, wherein said generating a set of coefficients by transforming the domain of said prediction error comprises:

computing a set of coefficients of a discrete cosine transform of said prediction error.

17. The method of claim 16, wherein said scanning each of said first and second sets of quantized coefficients comprises:

zig zag scanning each of said first and second sets of quantized coefficients.

18. The method of claim 17, wherein said applying an encoding scheme on each of said first and second scanned sets of quantized coefficients comprises:

applying an entropy coding scheme on each of said first and second scanned sets of quantized coefficients.

19. The method of claim 18, further comprising:

reconfiguring the quantizing algorithm used to produce at least one of said first and second independent sets of quantized coefficients.

20. The method of claim 17, further comprising:

reconfiguring the entropy coding scheme used to produce at least one of said first and second entropy coded sets of quantized coefficients.

21. The method of claim 20, further comprising:

periodically forcing said predicted current image frame to zero.

22. An apparatus for use in encoding, comprising:

an input configured to receive an input signal comprising content to be played back;

encoding circuitry coupled to said input, the encoding circuitry comprising a common encoder and at least two encoding channel modules coupled with the common encoder, where the common encoder is coupled with the input to receive the input signal and processes the input signal to generate, from the input signal, an intermediate signal comprising coefficients, and the two encoding channel modules each receive the intermediate signal and encode the intermediate signal according to different sets of encoding attributes, such that the encoding circuitry is configured to generate multiple encoded output signals from said input signal; and multiple outputs coupled to said encoding circuitry, where each of the outputs is configured to provide a respective one of said encoded output signals where each encoded output signal is configured to be played back by one or more playback device.

23. The encoding apparatus of claim 22, wherein said encoding circuitry is configured to be reconfigurable to change the encoding of one of said encoded signals.

24. A method for use in producing encoded signals, comprising:

receiving a video input signal;

encoding through an encoding system said video input signal to produce at least two encoded video signals adapted to be played back by one or more playback devices, where the encoding comprise generating a prediction error based on a current frame and concurrently encoding the prediction error according to at least two different sets of encoding attributes producing the at least two encoded video signals;

outputting said at least two encoded video signals;

wherein said encoding said input video signal to produce at least two encoded video signals comprises:

encoding said input video signal according to a first set of encoding parameters to produce the first encoded video signal; and simultaneously encoding said input video signal according to a second set of encoding parameters to produce the second encoded video signal;

receiving a command to change one of said first set of encoding parameters and said second set of encoding parameters; and changing one of said first set of encoding parameters and said second set of encoding parameters responsive to said received command, one of said first encoded video signal and said second encoded video signal is altered responsive to said act of changing.

25. A system for use in viewing video material, comprising:

an input receiving a video signal;

an encoding device coupled to said input, wherein the encoding device is configured to encode said video signal into at least a first encoded signal and a second encoded signal, wherein the encoding device receives the video signal, processes the video signal and generates a prediction error, and the prediction error is concurrently encoded according to two different sets of encoding attributes to generate the first encoded signal and the second encoded signal;

a first display system coupled to said encoding device and receiving said first encoded signal, said first display system decoding said first encoded signal to produce a first video display signal, said first display system displaying said first video display signal; and a second display system coupled to said encoding device and receiving said second encoded signal, said second display system decoding said second encoded signal to produce a second video display signal, said second display system displaying said second video display signal.

26. The system for use in viewing video material of claim 25, wherein said encoding device comprising:

a first encoding subcircuit outputting said first encoded signal;

a second encoding subcircuit outputting said second encoded signal; and a reconfiguration input receiving a reconfiguration command, a corresponding one of said first encoding subcircuit and said second encoding subcircuit being reconfigured responsive to said received reconfiguration command, whereby a corresponding one of said first encoded signal and said second encoded signal is changed responsive to said reconfiguration.

* * * * *

UNITED STATES PATENT AND TRADEMARK OFFICE
CERTIFICATE OF CORRECTION

PATENT NO. : 7,580,460 B2  Page 1 of 1
APPLICATION NO. : 10/403103
DATED : August 25, 2009
INVENTOR(S) : Ota et al.

It is certified that error appears in the above-identified patent and that said Letters Patent is hereby corrected as shown below:

In the CLAIMS:
Claim 15, column 17, line 11, delete "base" and insert --based--.
Claim 15, column 17, line 12, delete "coefficients base" and insert --coefficients based--.
Claim 15, column 17, line 13, delete "error base" and insert --error based--.
Claim 15, column 17, line 15, delete "base" and insert --based--.

Signed and Sealed this

Eighth Day of December, 2009

David J. Kappos
*Director of the United States Patent and Trademark Office*